(12) United States Patent
Wei et al.

(10) Patent No.: US 11,535,783 B2
(45) Date of Patent: *Dec. 27, 2022

(54) FUSIBLE PHASE-CHANGE POWDERS FOR THERMAL MANAGEMENT, METHODS OF MANUFACTURE THEREOF, AND ARTICLES CONTAINING THE POWDERS

(71) Applicant: ROGERS CORPORATION, Chandler, AZ (US)

(72) Inventors: Ming Wei, Cranston, RI (US); Sharon Soong, Natick, MA (US); Ian Smith, Dayville, CT (US)

(73) Assignee: ROGERS CORPORATION, Chandler, AZ (US)

( * ) Notice: Subject to any disclaimer, the term of this patent is extended or adjusted under 35 U.S.C. 154(b) by 344 days.

This patent is subject to a terminal disclaimer.

(21) Appl. No.: 16/641,067

(22) PCT Filed: Aug. 27, 2018

(86) PCT No.: PCT/US2018/048071
§ 371 (c)(1),
(2) Date: Feb. 21, 2020

(87) PCT Pub. No.: WO2019/046154
PCT Pub. Date: Mar. 7, 2019

(65) Prior Publication Data
US 2020/0172783 A1 Jun. 4, 2020

Related U.S. Application Data (60) Provisional application No. 62/553,413, filed on Sep. 1, 2017.

(51) Int. Cl.
| | | |
|---|---|---|
| *C09K 5/06* | (2006.01) | |
| *B29C 45/00* | (2006.01) | |
| *C08L 91/06* | (2006.01) | |
| *F28D 20/02* | (2006.01) | |
| *B29K 91/00* | (2006.01) | |
| *B29K 105/00* | (2006.01) | |
| *B29L 31/34* | (2006.01) | |
| *F28D 20/00* | (2006.01) | |

(52) U.S. Cl.
CPC .......... *C09K 5/063* (2013.01); *B29C 45/0001* (2013.01); *C08L 91/06* (2013.01); *F28D 20/023* (2013.01); *B29K 2091/00* (2013.01); *B29K 2105/0026* (2013.01); *B29K 2105/0044* (2013.01); *B29K 2105/251* (2013.01); *B29L 2031/34* (2013.01); *C08L 2201/02* (2013.01); *C08L 2201/08* (2013.01); *F28D 2020/0017* (2013.01)

(58) Field of Classification Search
CPC .... C09K 5/063; C09K 21/00; B29C 45/0001; C08L 91/06; C08L 2201/02; C08L 2201/08; F28D 20/023; F28D 2020/0017; B29K 2091/00; B29K 2105/0026; B29K 2105/0044; B29K 2105/251; B29L 2031/34; Y02E 60/14

USPC ......................................................... 252/74
See application file for complete search history.

(56) References Cited

U.S. PATENT DOCUMENTS

| | | |
|---|---|---|
| 4,617,332 A | 10/1986 | Salyer et al. |
| 4,825,939 A | 5/1989 | Salyer et al. |
| 5,677,048 A | 10/1997 | Pushaw |
| 5,722,482 A | 3/1998 | Buckley |
| 5,911,923 A | 6/1999 | Work et al. |
| 6,391,442 B1 | 5/2002 | Duvall et al. |
| 6,673,434 B2 | 1/2004 | Nguyen |
| 6,703,127 B2 | 3/2004 | Davis et al. |
| 6,765,031 B2 | 7/2004 | Salyer et al. |
| 6,835,453 B2 | 12/2004 | Greenwood et al. |
| 6,892,478 B1 | 5/2005 | Erickson et al. |
| 7,025,093 B2 | 4/2006 | Bonner et al. |
| 7,320,770 B2 | 1/2008 | Chomard et al. |
| 7,462,309 B2 | 12/2008 | Miller et al. |
| 7,682,690 B2 | 3/2010 | Bunyan et al. |
| 8,333,903 B2 | 12/2012 | Rolland et al. |
| 8,587,945 B1 * | 11/2013 | Hartmann ............... H01L 23/42 361/720 |
| 8,618,205 B2 | 12/2013 | Shimakage et al. |
| 2002/0033247 A1 | 3/2002 | Neuschutz et al. |
| 2003/0085488 A1 | 5/2003 | Newell et al. |
| 2003/0088019 A1 | 5/2003 | Pause et al. |

(Continued)

FOREIGN PATENT DOCUMENTS

| | | |
|---|---|---|
| CN | 16355044 A | 7/2005 |
| CN | 101434832 A | 5/2009 |

(Continued)

OTHER PUBLICATIONS

International Search Report for International Application No. PCT/US2018/048071; International filing date: Aug. 27, 2018; dated Nov. 23, 2018; 5 pages.

(Continued)

*Primary Examiner* — Douglas J McGinty
(74) *Attorney, Agent, or Firm* — Cantor Colburn LLP (57) ABSTRACT

A fusible, phase-change powder composition includes a plurality of powder particles comprising a polymer composition, an unencapsulated phase-change material, and optionally, an additive composition; wherein the powder composition is fusible at a temperature of 25 to 105° C., or 28 to 60° C., or 45 to 85° C., or 60 to 80° C., or 80 to 100° C.

20 Claims, 1 Drawing Sheet

(56) References Cited

U.S. PATENT DOCUMENTS

| | | |
|---|---|---|
| 2005/0104029 A1 | 5/2005 | Neuschuetz |
| 2005/0208286 A1 | 9/2005 | Hartmann et al. |
| 2006/0272281 A1* | 12/2006 | Marshall ............... D21H 27/20 52/796.1 |
| 2009/0294094 A1 | 12/2009 | Suzuki et al. |
| 2010/0264353 A1* | 10/2010 | Hartmann ........... D06M 15/273 525/54.23 |
| 2011/0121246 A1 | 5/2011 | Biggin et al. |
| 2012/0149265 A1 | 6/2012 | Mistry et al. |
| 2012/0261607 A1* | 10/2012 | Shimakage ............. B32B 27/36 252/70 |
| 2013/0224458 A1 | 8/2013 | Bolliou |
| 2013/0245147 A1* | 9/2013 | Altmann ................. C08L 23/06 521/149 |
| 2013/0296449 A1 | 11/2013 | Peterson et al. |
| 2014/0027003 A1* | 1/2014 | Van Eibergen ......... C08L 23/16 252/73 |
| 2014/0087105 A1 | 3/2014 | Formato et al. |
| 2015/0197610 A1 | 7/2015 | Peterson et al. |
| 2015/0203734 A1* | 7/2015 | Kanae ...................... C08K 5/01 252/79 |
| 2016/0226114 A1* | 8/2016 | Hartmann ............. H01M 50/24 |
| 2016/0319174 A1* | 11/2016 | Razack ................... B05D 1/18 |
| 2017/0210961 A1 | 7/2017 | Mason |
| 2017/0370656 A1* | 12/2017 | Kawazoe .................. B32B 5/18 |
| 2018/0149547 A1 | 5/2018 | Ramirez |
| 2019/0127620 A1 | 5/2019 | Wei et al. |
| 2019/0375939 A1 | 12/2019 | Wei et al. |
| 2022/0002604 A1* | 1/2022 | Wei ......................... C08L 23/16 |

FOREIGN PATENT DOCUMENTS

| | | |
|---|---|---|
| CN | 101671149 | 3/2010 |
| CN | 103113852 | 5/2013 |
| EP | 1490642 A1 | 12/2004 |
| EP | 3239270 A1 | 11/2017 |
| JP | H0366788 A | 3/1991 |
| JP | 2006512520 A | 4/2006 |
| JP | 2009286811 A | 12/2009 |
| JP | 2014500359 A | 1/2014 |
| JP | 2014037534 A | 2/2014 |
| JP | 2014111746 A | 6/2014 |
| JP | 2015081297 | 4/2015 |
| JP | 2015134931 A1 | 7/2015 |
| TW | 201107031 A | 3/2011 |
| TW | 201501603 | 1/2015 |
| WO | 03085346 A1 | 10/2003 |
| WO | 2005097935 | 10/2005 |
| WO | 2015056260 A1 | 4/2015 |
| WO | 2015095271 | 6/2015 |
| WO | 2016069437 A1 | 5/2016 |
| WO | 2017189255 A1 | 11/2017 |

OTHER PUBLICATIONS

Written Opinion of the International Search Authority for International Application No. PCT/US2018/048071; International Filing Date: Aug. 27, 2018; dated Nov. 23, 2018; 9 pages.

Xiao, Min et al., "Preparation and Performance of Shape Stabilized Phase Change Thermal Storage Materials with High Thermal Conductivity", Energy Conversion and Management 43 (2002); pp. 103-108.

Mah, T. et al., "Investigation of the Contribution of Garment Design to Thermal Protection. Part 1: Characterizing Air Gaps using Three-dimensional Body Scanning for Women's Protective Clothing", Textile Research Journal vol. 80(13) pp. 1317-1329.

* cited by examiner

FUSIBLE PHASE-CHANGE POWDERS FOR THERMAL MANAGEMENT, METHODS OF MANUFACTURE THEREOF, AND ARTICLES CONTAINING THE POWDERS

CROSS-REFERENCE TO RELATED APPLICATIONS

This Application is a U.S. National Stage Application of PCT/US2018/048071, filed Aug. 27, 2018, which claims priority to U.S. Provisional Patent Application No. 62/553, 413, filed Sep. 1, 2017, each of which is incorporated by reference in its entirety herein.

BACKGROUND

This disclosure relates to fusible phase-change materials (PCMs), and methods of manufacture thereof, as well as articles containing the PCMs.

Thermal management is desirable in a wide range of devices, including batteries, devices containing light-emitting diodes (LEDs), and devices containing circuits. For example, circuit designs for electronic devices such as televisions, radios, computers, medical instruments, business machines, and communications equipment have become increasingly smaller and thinner. The increasing power of such electronic components has resulted in increasing heat generation. Moreover, smaller electronic components are being densely packed into ever smaller spaces, resulting in more intense heat generation. Additionally, fast charging has been a new trend for the portable electronic device industry. Fast charging tends to result in overheating, either in the power adapter or in the device itself.

At the same time, electronic devices can be very sensitive to over-heating, negatively influencing both lifetime and reliability of the parts. Temperature-sensitive elements in electronic devices may need to be maintained within a prescribed operating temperature in order to avoid significant performance degradation or even system failure. Consequently, manufacturers are continuing to face the challenge of dissipating heat generated in electronic devices, i.e., thermal management. Moreover, the internal design of electronic devices may include irregularly shaped cavities that present a significant challenge for known thermal management approaches.

Accordingly, there remains a need for new approaches for thermal management in various devices, and particularly in electronic devices. It would be an additional advantage if the solutions were effective for small or thin devices or devices with irregularly shaped cavities.

BRIEF SUMMARY

A fusible, phase-change powder composition comprises a plurality of powder particles comprising a polymer composition, an unencapsulated phase-change material, and optionally, an additive composition; wherein the powder composition is fusible at a temperature of 25 to 105° C., or 28 to 60° C., or 45 to 85° C., or 60 to 80° C., or 80 to 100° C., preferably the powder composition is fusible but not flowable at the temperature.

A method of manufacturing the fusible, phase-change powder composition comprises combining a composition comprising the polymer and optionally a solvent, molten unencapsulated phase-change material, and optionally an additive composition to form a mixture; optionally removing the solvent from the mixture; cooling the mixture to provide a solid phase-change material; and reducing the solid phase-change material to a powder to provide a fusible, phase-change powder composition.

A method of manufacturing an article comprising a phase-change composition comprises injecting the fusible, phase-change powder composition into a cavity of an article at a first temperature below the melting point of the phase-change material in the fusible, phase-change powder composition, and heating the fusible, phase-change powder composition at a second temperature above the melting point of the phase-change material in the fusible, phase-change powder composition and below the glass transition temperature of the composition to form a fused, solid phase-change composition, wherein the second temperature preferably is 25 to 105° C., or 28 to 60° C., or 45 to 85° C., or 60 to 80° C., or 80 to 100° C.

A solid phase-change composition made from the fusible, phase-change powder and an article comprising the fusible, phase-change powder composition or the solid phase-change composition are also disclosed.

The above described and other features are exemplified by the following FIGURE and detailed description.

BRIEF DESCRIPTION OF THE DRAWING

The following is a brief description of the drawing, which is presented for the purposes of illustrating the exemplary embodiments disclosed herein and not for the purposes of limiting the same.

DETAILED DESCRIPTION

Figure 1:
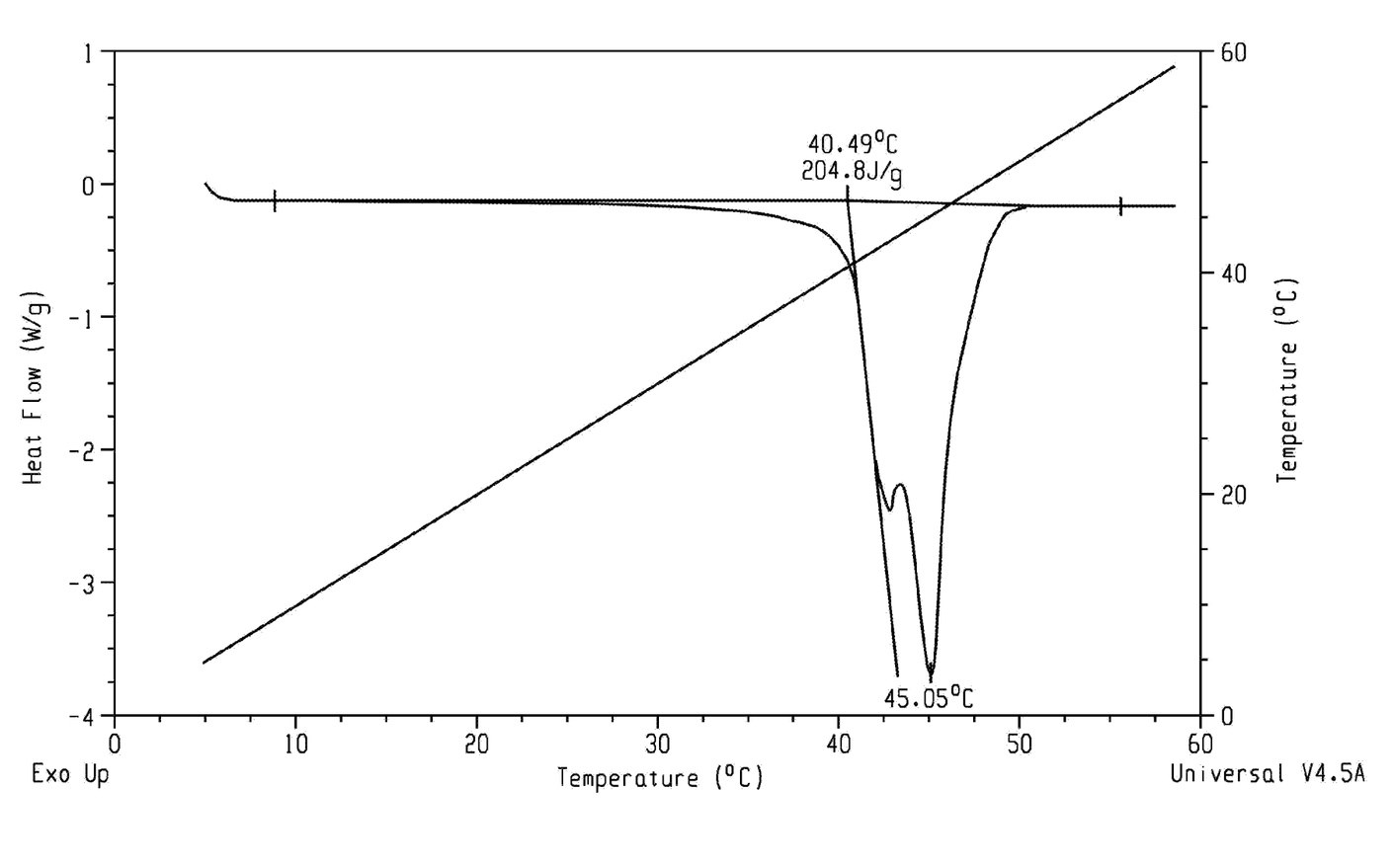
The FIGURE is a differential scanning calorimetry (DSC) trace showing normalized heat flow (W/g) versus temperature (° C.) of the fusible PCM powder of the Example.

The inventors hereof have developed fusible phase-change compositions having a high heat of fusion at the phase transition temperature that are in powder form at low temperatures and advantageously can be injected into a desired location of any shape. The powder particles comprise a polymer composition and a phase-change material. Heating the powder at temperatures above the melting temperature of the phase-change material but below the glass transition temperature of the polymer composition for a short period results in fusion of the powder particles such that the phase-change composition will be unable to leak from its location(s) in the device. These compositions are especially suitable for providing excellent thermal protection to devices, e.g., electronic devices, and have the benefit that the powder can be readily fit into irregularly shaped cavities in such devices in order to maximize heat absorption capacity while after fusion of the powder the composition is unable to leak out of the device at the operating temperature ($\geq 100$ C).

The fusible phase-change powder composition comprises a plurality of powder particles including a polymer composition and an unencapsulated phase-change material. Optionally, the phase-change powder composition further comprises an additive composition. The unencapsulated phase-change material and the polymer composition are selected to have good compatibility, permitting a large amount of phase-change material to be absorbed in a miscible blend with the polymer composition.

A phase-change material (PCM) is a substance with a high heat of fusion, and that is capable of absorbing and releasing high amounts of latent heat during a phase transition, such as melting and solidification, respectively. During the phase change, the temperature of the phase-change material remains nearly constant. The phase-change material inhibits or stops the flow of thermal energy through the material during the time the phase-change material is absorbing or releasing heat, typically during the material's change of phase. In some instances, a phase-change material can inhibit heat transfer during a period of time when the phase-change material is absorbing or releasing heat, typically as the phase-change material undergoes a transition between two states. This action is typically transient and will occur until a latent heat of the phase-change material is absorbed or released during a heating or cooling process. Heat can be stored or removed from a phase-change material, and the phase-change material typically can be effectively recharged by a source of heat or cold.

Phase-change materials thus have a characteristic transition temperature. The term "transition temperature," or "phase change temperature" refers to an approximate temperature at which a material undergoes a transition between two states. In some embodiments, e.g. for a commercial paraffin wax of mixed composition, the transition "temperature" can be a temperature range over which the phase transition occurs.

In principle, it is possible to use phase-change materials having a phase change temperature of −100 to 150° C. in the phase-change compositions. For use in LED and electronic components, in particular, the phase-change material incorporated into the phase-change composition can have a phase change temperature of 0 to 115° C., 10 to 105° C., 20 to 100° C., or 30 to 95° C. In an embodiment, the phase-change material has a melting temperature of 25 to 105° C., or 28 to 60° C., or 45 to 85° C., or 60 to 80° C., or 80 to 100° C.

The selection of a phase-change material typically depends upon the transition temperature that is desired for a particular application that is going to include the phase-change material. For example, a phase-change material having a transition temperature near normal body temperature or around 37° C. can be desirable for electronics applications to prevent user injury and protect overheating components. The phase-change material can have a transition temperature in the range of −5 to 150° C., or 0 to 90° C., or 30 to 70° C., or 35 to 50° C.

In other applications, for example a battery for an electric vehicle, a phase change temperature of 65° C. or higher can be desirable. A phase-change material for such applications can have a transition temperature in the range of 45 to 85° C., or 60 to 80° C., or 80 to 100° C.

The transition temperature can be expanded or narrowed by modifying the purity of the phase-change material, molecular structure, blending of phase-change materials, or any combinations thereof.

By selecting two or more different phase-change materials and forming a mixture, the temperature stabilizing range of the phase-change material can be adjusted for any desired application. A temperature stabilizing range can include a specific transition temperature or a range of transition temperatures. The resulting mixture can exhibit two or more different transition temperatures or a single modified transition temperature when incorporated in the phase-change powder compositions described herein.

In some embodiments, it can be advantageous to have multiple or broad transition temperatures. If a single narrow transition temperature is used, this can cause thermal/energy buildup before the transition temperature is reached. Once the transition temperature is reached, then energy will be absorbed until the latent energy is consumed and the temperature will then continue to increase. Broad or multiple transition temperatures allow for temperature regulation and thermal absorption as soon the temperature starts to increase, thereby alleviating any thermal/energy buildup. Multiple or broad transition temperatures can also more efficiently help conduct heat away from a component by overlapping or staggering thermal absorptions. For instance for a composition containing a first phase-change material (PCM1) which absorbs at 35 to 40° C. and a second phase-change material (PCM2) which absorbs at 38 to 45° C., PCM1 will start absorbing and controlling temperature until a majority of the latent heat is used, at which time PCM2 will start to absorb and conduct energy from PCM1 thereby rejuvenating PCM1 and allowing it to keep functioning.

The selection of the phase-change material can depend upon the latent heat of the phase-change material. A latent heat of the phase-change material typically correlates with its ability to absorb and release energy/heat or modify the heat transfer properties of the article. In some instances, the phase-change material can have a latent heat of fusion that is at least 80 Joules/gram (J/g), or at least 100 J/g, or at least 120 J/g, or at least 140 J/g, or at least 150 J/g, or at least 170 J/g, or at least 180 J/g, or at least 185 J/g, or at least 190 J/g, or at least 200 J/g, or at least 220 J/g. Thus, for example, the phase-change material can have a latent heat of fusion of 20 J/g to 400 J/g, such as 80 J/g to 400 J/g, or 100 J/g to 400 J/g, or 150 J/g to 400 J/g, or 170 J/g to 400 J/g, or 190 J/g to 400 J/g.

Phase-change materials that can be used include various organic and inorganic substances. Examples of phase-change materials include hydrocarbons (e.g., straight-chain alkanes or paraffinic hydrocarbons, branched-chain alkanes, unsaturated hydrocarbons, halogenated hydrocarbons, and alicyclic hydrocarbons), silicone wax, alkanes, alkenes, alkynes, arenes, hydrated salts (e.g., calcium chloride hexahydrate, calcium bromide hexahydrate, magnesium nitrate hexahydrate, lithium nitrate trihydrate, potassium fluoride tetrahydrate, ammonium alum, magnesium chloride hexahydrate, sodium carbonate decahydrate, disodium phosphate dodecahydrate, sodium sulfate decahydrate, and sodium acetate trihydrate), waxes, oils, water, saturated and unsaturated fatty acids for example, caproic acid, caprylic acid, lauric acid, myristic acid, palmitic acid, stearic acid, arachidic acid, behenic acid, lignoceric acid cerotic acid, and the like), fatty acid esters (for example, fatty acid $C_1$-$C_4$ alkyl esters, such as methyl caprylate, methyl caprate, methyl laurate, methyl myristate, methyl palmitate, methyl stearate, methyl arachidate, methyl behenate, methyl lignocerate, and the like), fatty alcohols (for example, capryl alcohol, lauryl alcohol, myristyl alcohol, cetyl alcohol, stearyl alcohol, arachidyl alcohol, behenyl alcohol, lignoceryl alcohol, ceryl alcohol, montanyl alcohol, myricyl alcohol, and geddyl alcohol, and the like), dibasic acids, dibasic esters, 1-halides, primary alcohols, secondary alcohols, tertiary alcohols, aromatic compounds, clathrates, semi-clathrates, gas clathrates, anhydrides (e.g., stearic anhydride), ethylene carbonate, methyl esters, polyhydric alcohols (e.g., 2,2-dimethyl-1,3-propanediol, 2-hydroxymethyl-2-methyl-1,3-propanediol, ethylene glycol, polyethylene glycol, pentaerythritol, dipentaerythritol, pentaglycerine, tetramethylol ethane, neopentyl glycol, tetramethylol propane, 2-amino-2-methyl-1,3-propanediol, monoaminopentaerythritol, diaminopentaerythritol, and tris(hydroxymethyl)acetic acid), sugar alcohols (erythritol, D-mannitol, galactitol, xylitol, D-sorbitol), polymers (e.g., polyethylene, polyethylene glycol, polyethylene oxide, polypropylene, polypropylene glycol, polytetramethylene glycol, polypropylene malonate, polyneopentyl glycol sebacate, polypentane glutarate, polyvinyl myristate, polyvinyl stearate, polyvinyl laurate, polyhexadecyl methacrylate, polyoctadecyl methacrylate, polyesters produced by polycondensation of glycols (or their derivatives) with diacids (or their derivatives), and copolymers, such as polyacrylate or poly(meth)acrylate with alkyl hydrocarbon side chain or with polyethylene glycol side chain and copolymers including polyethylene, polyethylene glycol, polyethylene oxide, polypropylene, polypropylene glycol, or polytetramethylene glycol), metals, and mixtures thereof. Various vegetable oils can be used, for example soybean oils, palm oils, or the like. Such oils can be purified or otherwise treated to render them suitable for use as phase-change materials. In an embodiment a phase-change material used in the phase-change powder composition is an organic substance.

Paraffinic phase-change materials can be a paraffinic hydrocarbon, that is, a hydrocarbon represented by the formula $C_nH_{n+2}$, where n can range from 10 to 44 carbon atoms. The melting point and heat of fusion of a homologous series of paraffin hydrocarbons is directly related to the number of carbon atoms, as shown in the following table.

TABLE 1

Melting Points of Paraffinic Hydrocarbons

| Paraffinic Hydrocarbon | No. of Carbon Atoms | Melting Point (° C.) |
| --- | --- | --- |
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Similarly, the melting point of a fatty acid depends on the chain length.

In an embodiment, the phase-change material can comprise a paraffinic hydrocarbon, a fatty acid, or a fatty acid ester having 15 to 40 carbon atoms, 18 to 35 carbon atoms, or 18 to 28 carbon atoms. The phase-change material can be a single paraffinic hydrocarbon, fatty acid, or fatty acid ester, or a mixture of hydrocarbons, fatty acids, and/or fatty acid esters. In a preferred embodiment the phase-change material has a melting temperature of 5 to 70° C., 25 to 65° C., 35 to 60° C., or 30 to 50° C.

The heat of fusion of the phase-change material, determined by differential scanning calorimetry according to ASTM D4118, can be greater than 150 Joules/gram, preferably greater than 180 Joules per gram, more preferably greater than 210 Joules/gram The phase-change powder composition includes a phase-change material in an unencapsulated ("raw") form, although the composition can further include a phase-change material in an encapsulated form as an additive as described in further detail below. The amount of the unencapsulated phase-change material depends on the type of material used, the desired phase change temperature, the type of polymer used, and like considerations, but is selected to provide a miscible blend of the phase-change material and the polymer composition after mixing. The amount of the unencapsulated phase-change material can be 20 to 97 weight percent, or 40 to 90 weight percent, or 70 to 97 weight percent, based on the total weight of the phase-change powder composition, provided that a miscible blend of the phase-change material and the polymer composition is formed after mixing. In a preferred embodiment a large amount of unencapsulated phase-change material is present, in particular 70 to 97 weight percent, or 85 to 97 weight percent, or 80 to 97 weight percent, or even 90 to 97 weight percent, based on the total weight of the phase-change powder composition.

The fusible, phase-change powder composition further comprises a polymer composition that includes a polymer that can be thermoset or thermoplastic. As used herein, "polymer" includes oligomers, ionomers, dendrimers, homopolymers, and copolymers (such as graft copolymers, random copolymers, block copolymers (e.g., star block copolymers, random copolymers, and the like. The polymer composition can be a single polymer or a combination of polymers. The combination of polymers can be, for example, a blend of two or more polymers having different chemical compositions, different weight average molecular weights, or a combination of the foregoing. Careful selection of the polymer or of the combination of polymers allows for tuning of the properties of the fusible, phase-change powder compositions.

The polymer can be present in the fusible, phase-change powder composition in an amount of 3 to 80 weight percent, or 10 to 60 weight percent, or 15 to 50 weight percent, or 5 to 20 weight percent, the weight percents being based on the total weight of the fusible, phase-change powder composition.

The type and amount of the polymer composition is selected to have good compatibility with the phase-change material, in order to form a miscible blend of the polymer composition and a large quantity of the phase-change material, e.g., at least 50% by weight of the total fusible, phase-change powder composition, or at least 75% by weight of the total composition, or at least 80% by weight of the total composition, or even 90 to 97% by weight of the total composition. In an unexpected feature, it has been found that careful selection of the polymer composition to incorporate large quantities of the phase-change material as a miscible blend provides a product that is fusible as described herein, but not flowable at higher temperatures, e.g., above 50° C., such as 50 to 200° C., or 85° C. to 200° C., or 100 to 200° C. The phase-change compositions can accordingly be incorporated as a powder, fused, and then not substantially flow at operating temperatures of the articles.

In an embodiment, the polymer composition has low polarity. Low polarity of the polymer composition enables compatibility with a phase-change material of non-polar nature.

One parameter that can be used to assess compatibility of the polymer composition with the phase-change material is the "solubility parameter" (δ) of the polymer composition and of the phase-change material. Solubility parameters can be determined by any known method in the art or obtained for many polymers and phase-change materials from published tables. The polymer composition and phase-change material should have similar solubility parameters to form a miscible blend. The solubility parameter (δ) of the polymer composition is within ±1, or ±0.9, or ±0.8, or ±0.7, or ±0.6, or ±0.5, or ±0.4, or ±0.3 of the solubility parameter of the phase-change material.

A wide variety of polymers can be used depending on the phase-change material and other desired characteristics of the phase-change powder composition. Exemplary polymers that are commonly considered thermoset include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), polydienes such as polybutadienes (including homopolymers and copolymers thereof, e.g. poly(butadiene-isoprene)), polyisocyanates, polyureas, polyurethanes, triallyl cyanurate polymers, triallyl isocyanurate polymers, certain silicones, and polymerizable prepolymers (e.g., prepolymers having ethylenic unsaturation, such as unsaturated polyesters, polyimides), or the like. The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl)acrylate, a ($C_{1-6}$ alkyl) methacrylate, acrylonitrile, vinyl acetate, allyl acetate, triallyl cyanurate, triallyl isocyanurate, or acrylamide. The molecular weight of the prepolymers can be 400 to 10,000 Daltons on average.

Exemplary polymers that are generally considered thermoplastic include cyclic olefin polymers (including polynorbornenes and copolymers containing norbornenyl units, for example copolymers of a cyclic polymer such as norbornene and an acyclic olefin such as ethylene or propylene), fluoropolymers (e.g., polyvinyl fluoride (PVF), polyvinylidene fluoride (PVDF), fluorinated ethylene-propylene (FEP), polytetrafluoroethylene (PTFE), poly(ethylene-tetrafluoroethylene (PETFE), perfluoroalkoxy (PFA)), polyacetals (e.g., polyoxyethylene and polyoxymethylene), poly($C_{1-6}$ alkyl)acrylates, polyacrylamides (including unsubstituted and mono-N— and di-N—($C_{1-8}$ alkyl)acrylamides), polyacrylonitriles, polyamides (e.g., aliphatic polyamides, polyphthalamides, and polyaramides), polyamideimides, polyanhydrides, polyarylene ethers (e.g., polyphenylene ethers), polyarylene ether ketones (e.g., polyether ether ketones (PEEK) and polyether ketone ketones (PEKK)), polyarylene ketones, polyarylene sulfides (e.g., polyphenylene sulfides (PPS)), polyarylene sulfones (e.g., polyethersulfones (PES), polyphenylene sulfones (PPS), and the like), polybenzothiazoles, polybenzoxazoles, polybenzimidazoles, polycarbonates (including homopolycarbonates and polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetherimides (including copolymers such as polyetherimide-siloxane copolymers), polyimides (including copolymers such as polyimide-siloxane copolymers), poly($C_{1-6}$ alkyl)methacrylates, polymethacrylamides (including unsubstiuted and mono-N— and di-N—($C_{1-8}$ alkyl)acrylamides), polyolefins (e.g., polyethylenes, polypropylenes, and their halogenated derivatives (such as polytetrafluoroethylenes), and their copolymers, for example ethylene-alpha-olefin copolymers), polyoxadiazoles, polyoxymethylenes, polyphthalides, polysilazanes, polysiloxanes (silicones), polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, vinyl polymers (including polyvinyl alcohols, polyvinyl esters, polyvinyl ethers, polyvinyl halides (e.g, polyvinyl fluoride), polyvinyl ketones, polyvinyl nitriles, polyvinyl thioethers, and polyvinylidene fluorides), or the like. A combination comprising at least one of the foregoing polymers can be used.

A preferred type of polymer class is elastomers, which can be optionally crosslinked. In some embodiments, use of a crosslinked (i.e., cured) elastomer provides lower flow of the compositions at higher temperatures. Suitable elastomers can be elastomeric random, grafted, or block copolymers. Examples include natural rubber, butyl rubber, polydicyclopentadiene rubber, fluoroelastomers, ethylene-propylene rubber (EPR), ethylene-butene rubber, ethylene-propylene-diene monomer rubber (EPDM, or ethylene propylene diene terpolymer), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like.

Elastomeric block copolymers comprise a block (A) derived from an alkenyl aromatic compound and a block (B) derived from a conjugated diene. The arrangement of blocks (A) and (B) include linear and graft structures, including radial teleblock structures having branched chains. Examples of linear structures include diblock (A-B), triblock (A-B-A or B-A-B), tetrablock (A-B-A-B), and pentablock (A-B-A-B-A or B-A-B-A-B) structures as well as linear structures containing 6 or more blocks in total of A and B. Specific block copolymers include diblock, triblock, and tetrablock structures, and specifically the A-B diblock and A-B-A triblock structures. In some embodiments, the elastomer is a styrenic block copolymer (SBC) consisting of polystyrene blocks and rubber blocks. The rubber blocks can be polybutadiene, polyisoprene, their hydrogenated equivalents, or a combination comprising at least one of the foregoing. Examples of styrenic block copolymers include styrene-butadiene block copolymers, e.g. Kraton D SBS polymers (Kraton Performance Polymers, Inc.); styrene-ethylene/propylene block copolymers, e.g., Kraton G SEPS (Kraton Performance Polymers, Inc.) or styrene-ethylene/butadiene block copolymers, e.g., Kraton G SEBS (Kraton Performance Polymers, Inc.); and styrene-isoprene block copolymers, e.g., Kraton D SIS polymers (Kraton Performance Polymers, Inc.). In certain embodiments, the polymer is a styrene-ethylene/propylene block copolymer, e.g., Kraton G 1642. In other embodiments, the polymer is a styrene butadiene block copolymer, e.g. Kraton D1118.

In certain embodiments, the polymer is Kraton G SEBS or SEPS, a styrene-butadiene block copolymer, polybutadiene, EPDM, natural rubber, butyl rubber, cyclic olefin copolymer, polydicyclopentadiene rubber, or a combination comprising one or more of the foregoing.

The phase-change powder composition can be characterized by a heat of fusion, determined by differential scanning calorimetry according to ASTM D4118, of greater than 150 Joules/gram, preferably greater than 180 Joules per gram, more preferably greater than 200 Joules/gram.

The phase-change powder compositions can consist, or consist essentially of, the combination of the unencapsulated phase-change material and the polymer composition alone, in the amounts described above. Alternatively, the phase-change compositions can further comprise other components as additives, for example an encapsulated phase-change material, a filler, or other additives known in the art. Such additional components are selected so as to not significantly adversely affect the desired properties of the phase-change compositions, in particular the temperature at which the phase-change powder composition is fusible.

For example, although the phase-change composition comprises an unencapsulated phase-change material, the phase-change composition can further include a phase-change material in an encapsulated form as an additive. Encapsulation of a phase-change material essentially creates a container for the phase-change material so that regardless of whether the phase-change material is in the solid or liquid state, the phase-change material is contained. Methods for encapsulating materials, such as phase-change materials, are known in the art (see for example, U.S. Pat. Nos. 5,911,923 and 6,703,127). Microencapsulated and macroencapsulated phase-change materials are also available commercially (e.g., from Microtek Laboratories, Inc.) Macrocapsules have an average particle size of 1000 to 10,000 micrometers, whereas microcapsules have an average particle size less than 1000 micrometers. The encapsulated phase-change material can be encapsulated in a microcapsule and the mean particle size of the microcapsules can be 1 to 100 micrometers, or 2 to 50 micrometers, or 5 to 40 micrometers. Herein, mean particle size of an encapsulated PCM is a volume weighted mean particle size, determined for example using a Malvern Mastersizer 2000 Particle Analyzer, or equivalent instrumentation. The encapsulated phase-change material can be included in an amount of 1 to 50 weight percent (wt %), specifically 1 to 40 wt %, or 5 to 30 wt %, or 10 to 30 wt %, each based on a total weight of the phase-change composition.

The fusible phase-change powder composition can further comprise a filler, for example a filler to adjust the dielectric, thermally conductive, or magnetic properties of the phase-change composition. A low coefficient of expansion filler, such as glass beads, silica or ground micro-glass fibers, can be used. A thermally stable fiber, such as an aromatic polyamide, or a polyacrylonitrile can be used. Representative dielectric fillers include titanium dioxide (rutile and anatase), barium titanate, strontium titanate, fused amorphous silica, corundum, wollastonite, aramide fibers (e.g., KEVLAR™ from DuPont), fiberglass, $Ba_2T_{19}O_{20}$, quartz, aluminum nitride, silicon carbide, beryllia, alumina, magnesia, mica, talcs, nanoclays, aluminosilicates (natural and synthetic), iron oxide, $CoFe_2O_4$ (nanostructured powder available from Nanostructured & Amorphous Materials, Inc.), single wall or multiwall carbon nanotubes, and fumed silicon dioxide (e.g., Cab-O-Sil, available from Cabot Corporation), each of which can be used alone or in combination.

Other types of fillers that can be used include a thermoconductive filler, a thermally insulating filler, a magnetic filler, or a combination comprising at least one of the foregoing. Thermoconductive fillers include, for example, boron nitride, silica, alumina, zinc oxide, magnesium oxide, and aluminum nitride. Examples of thermally insulating fillers include, for example, organic polymers in particulate form. The magnetic fillers can be nanosized.

The fillers can be in the form of solid, porous, or hollow particles. The particle size of the filler affects a number of important properties including coefficient of thermal expansion, modulus, elongation, and flame resistance. In an embodiment, the filler has an average particle size of 0.1 to 15 micrometers, specifically 0.2 to 10 micrometers. The filler can be a nanoparticle, i.e., a nanofiller, having an average particle size of 1 to 100 nanometers (nm), or 5 to 90 nm, or 10 to 80 nm, or 20 to 60 nm. A combination of fillers having a bimodal, trimodal, or higher average particle size distribution can be used. The filler can be included in an amount of 0.1 to 80 wt %, specifically 1 to 65 wt %, or 5 to 50 wt %, based on a total weight of the phase-change powder composition.

In addition the phase-change powder composition can further optionally comprise additives such as flame retardants, cure initiators, crosslinking agents, viscosity modifiers, wetting agents, antioxidants, thermal stabilizers, colorants, or a combination comprising at least one of the foregoing. The particular choice of additives depends on the polymer composition used, the particular application of the phase-change composition, and the desired properties for that application, and are selected so as to enhance or not substantially adversely affect the electrical properties of the circuit subassemblies, such as thermal conductivity, dielectric constant, dissipation factor, dielectric loss, or other desired properties.

The flame retardant can be a metal carbonate, a metal hydrate, a metal oxide, a halogenated organic compound, an organic phosphorus-containing compound, a nitrogen-containing compound, or a phosphinate salt. Representative flame retardant additives include bromine-, phosphorus-, and metal oxide-containing flame retardants. Suitable bromine-containing flame retardants are generally aromatic and contain at least two bromines per compound. Some that are commercially available are from, for example, Albemarle Corporation under trade names Saytex BT-93W (ethylenebistetrabromophthalimide), Saytex 120 (tetradecaboromodiphenoxybenzene), and Great Lake under trade name BC-52, BC-58, Esschem Inc under the trade name FR1025.

Suitable phosphorus-containing flame retardants include various organic phosphorous compounds, for example an aromatic phosphate of the formula $(GO)_3P=O$, wherein each G is independently an $C_{1-36}$ alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Other suitable aromatic phosphates can be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Examples of suitable di- or polyfunctional aromatic phosphorous-containing compounds include resorcinol tetraphenyl diphosphate (RDP), the bis (diphenyl) phosphate of hydroquinone, and the bis(diphenyl) phosphate of bisphenol-A, respectively, their oligomeric and polymeric counterparts, and the like.

Metal phosphinate salts can also be used. Examples of phosphinates are phosphinate salts such as for example alicyclic phosphinate salts and phosphinate esters. Further examples of phosphinates are diphosphinic acids, dimethylphosphinic acid, ethylmethylphosphinic acid, diethylphosphinic acid, and the salts of these acids, such as for example the aluminum salts and the zinc salts. Examples of phosphine oxides are isobutylbis(hydroxyalkyl) phosphine oxide and 1,4-diisobutylene-2,3,5,6-tetrahydroxy-1,4-diphosphine oxide or 1,4-diisobutylene-1,4-diphosphoryl-2,3,5,6-tetrahydroxycyclohexane. Further examples of phosphorous-containing compounds are NH1197® (Chemtura Corporation), NH1511® (Chemtura Corporation), NcendX P-30®

(Albemarle), Hostaflam OP5500® (Clariant), Hostaflam OP910® (Clariant), EXOLIT 935 (Clariant), and Cyagard RF 1204®, Cyagard RF 1241® and Cyagard RF 1243R (Cyagard are products of Cytec Industries). In a particularly advantageous embodiment, a halogen-free composition has excellent flame retardance when used with EXOLIT 935 (an aluminum phosphinate). Still other flame retardants include melamine polyphosphate, melamine cyanurate, Melam, Melon, Melem, guanidines, phosphazanes, silazanes, DOPO (9,10-dihydro-9-oxa-10 phosphaphenanthrene-10-oxide), and 10-(2,5 dihydroxyphenyl)-10H-9-oxa-phospha-phenanthrene-10-oxide.

Suitable metal oxide flame retardants are magnesium hydroxide, aluminum hydroxide, zinc stannate, and boron oxide. Preferably, the flame retardant can be aluminum trihydroxide, magnesium hydroxide, antimony oxide, deca-bromodiphenyl oxide, decabromodiphenyl ethane, ethylene-bis (tetrabromophthalimide), melamine, zinc stannate, or boron oxide.

A flame retardant additives can be present in an amount known in the art for the particular type of additive used. In an embodiment the flame retardant type and amount is selected to provide an injectable PCM powder that can pass the UL94 VTM-2 standard when consolidated to a thickness of 0.3 millimeters.

Exemplary cure initiators include those useful in initiating cure (cross-linking) of the polymers, in the composition. Examples include, but are not limited to, azides, peroxides, sulfur, and sulfur derivatives. Free radical initiators are especially desirable as cure initiators. Examples of free radical initiators include peroxides, hydroperoxides, and non-peroxide initiators such as 2,3-dimethyl-2, 3-diphenyl butane. Examples of peroxide curing agents include dicumyl peroxide, alpha, alpha-di(t-butylperoxy)-m,p-diisopropyl-benzene, 2,5-dimethyl-2,5-di(t-butylperoxy)hexane-3, and 2,5-dimethyl-2,5-di(t-butylperoxy)hexyne-3, and mixtures comprising one or more of the foregoing cure initiators. The cure initiator, when used, can be present in an amount of 0.01 wt % to 5 wt %, based on the total weight of the phase-change composition.

Crosslinking agents are reactive monomers or polymers. In an embodiment, such reactive monomers or polymers are capable of co-reacting with the polymer in the phase-change composition. Examples of suitable reactive monomers include styrene, divinyl benzene, vinyl toluene, triallylcya-nurate, diallylphthalate, and multifunctional acrylate mono-mers (such as Sartomer compounds available from Sartomer Co.), among others, all of which are commercially available. Useful amounts of crosslinking agents are 0.1 to 50 wt %, based on the total weight of the phase-change composition.

Exemplary antioxidants include radical scavengers and metal deactivators. A non-limiting example of a free radical scavenger is poly[[6-(1,1,3,3-tetramethylbutyl)amino-s-tri-azine-2,4-diyl][(2,2,6,6,-tetramethyl-4-piperidyl)imino] hexamethylene[(2,2,6,6-tetramethyl-4-piperidyl)imino]], commercially available from Ciba Chemicals under the tradename Chimassorb 944. A non-limiting example of a metal deactivator is 2,2-oxalyldiamido bis[ethyl 3-(3,5-di-t-butyl-4-hydroxyphenyl)propionate] commercially available from Chemtura Corporation under the tradename Naugard XL-1. A single antioxidant or a mixture of two or more antioxidants can be used. Antioxidants are typically present in amounts of up to 3 wt %, specifically 0.5 to 2.0 wt %, based on the total weight of the phase-change composition.

Coupling agents can be present to promote the formation of or participate in covalent bonds connecting a metal surface or filler surface with a polymer. Exemplary coupling agents include 3-mercaptopropylmethyldimethoxy silane and 3-mercaptopropyltrimethoxy silane and hexamethylene-disilazanes.

In some embodiments, the phase-change composition can have a heat of fusion of at least 100 J/g, preferably at least 170 J/g, more preferably at least 220 J/g, yet more preferably at least 240 J/g.

The phase-change composition can be manufactured by combining the polymer composition and optionally a solvent, the unencapsulated phase-change material, and any additives to manufacture the phase-change composition. The combining can be by any suitable method, such as blending, mixing, or stirring. In an embodiment, the unencapsulated phase-change material is molten and the polymer composition is dissolved in the molten phase-change material. In an embodiment, the components used to form the phase-change composition, including the polymer composition and the unencapsulated phase-change material and the optional additives, can be combined by being dissolved or suspended in a solvent to provide a mixture or solution.

The mixture can be cooled to provide a solid phase-change material. The solid phase-change material can then be reduced to a powder of the desired particle size. Reducing the solid phase-change material to a powder can be performed by milling or grinding the solid to the desired particle size using any suitable type of grinding mill, such as a media mill, ball mill, two-roll mill, three-roll mill, bead mill, air-jet mill, or a cryogenic grinder.

The average particle size of the fusible powder can be 1 to 500 micrometers, or 5 to 300 micrometers, or 10 to 200 micrometers. Average particle size of the fusible powder is a volume weighted mean particle size, determined for example using a Malvern Mastersizer 2000 Particle Analyzer, or equivalent instrumentation.

The solvent, when included, is selected so as to dissolve the polymer, disperse the unencapsulated phase-change material and any other optional additives that can be present, and to have a convenient evaporation rate for forming and drying. A non-exclusive list of possible solvents is xylene; toluene; methyl ethyl ketone; methyl isobutyl ketone; hexane, and higher liquid linear alkanes, such as heptane, octane, nonane, and the like; cyclohexane; isophorone; various terpene-based solvents; and blended solvents. Specific exemplary solvents include xylene, toluene, methyl ethyl ketone, methyl isobutyl ketone, and hexane, and still more specifically xylene and toluene. The concentration of the components of the composition in the solution or dispersion is not critical and will depend on the solubility of the components, the filler level used, the method of application, and other factors. In general, the solution comprises 10 to 80 wt % solids (all components other than the solvent), more specifically 50 to 75 wt % solids, based on the total weight of the solution.

An article comprising the phase-change composition can be manufactured by injecting the fusible phase-change powder composition into a cavity of an article at a temperature below the melting point of the phase-change material in the composition. The injected fusible, phase-change powder composition can be heated at a second temperature above the melting point of the phase-change material in the fusible, phase-change powder composition and below the glass transition temperature of the composition to form a fused, solid phase-change composition. The second temperature can be 25 to 105° C., or 28 to 60° C., or 45 to 85° C., or 60 to 80° C., or 80 to 100° C. The cavity of the article has a smallest dimension of greater than the average particle size of the powder and less than 2 centimeters, preferably less than 1 centimeter, more preferably less than 0.5 centimeter, yet more preferably less than 0.1 centimeter. The article can be an electronic device, preferably a hand-held electronic device.

The phase-change composition can also be formed into an article by known methods, for example extruding, molding, or casting. For example, the composition can be formed into a layer by casting onto a carrier from which it is later released, or alternatively onto a substrate such as a conductive metal layer that will later be formed into a layer of a circuit structure.

After the article or layer is formed, any solvent is allowed to evaporate under ambient conditions, or by forced or heated air, to form the composition. The layer can be uncured or partially cured (B-staged) in the drying process, or the layer can be partially or fully cured, if desired, after drying. The layer can be heated, for example at 20 to 200° C., specifically 30 to 150° C., more specifically 40 to 100° C. The resulting composition can be stored prior to use, for example lamination and cure, partially cured and then stored, or laminated and fully cured.

The fusible, phase-change powder composition can be used in a variety of applications, and with particular advantage in articles containing irregularly shaped cavities that can be difficult to fill completely with solid composition PCMs. The composition can be used in a wide variety of electronic devices and any other devices that generate heat to the detriment of the performance of the processors and other operating circuits (memory, video chips, telecom chips, and the like). Examples of such electronic devices include cell phones, PDAs, smart-phones, tablets, laptop computers, and other generally portable devices. However, the fusible, phase-change powder composition can be incorporated into virtually any electronic device that requires cooling during operation. For example, electronics used in automotive components, aircraft components, radar systems, guidance systems, and GPS devices incorporated into civilian and military equipment and other vehicles can benefit from aspects of the various embodiments, such as batteries, engine control units (ECU), airbag modules, body controllers, door modules, cruise control modules, instrument panels, climate control modules, anti-lock braking modules (ABS), transmission controllers, and power distribution modules. The fusible, phase-change powder composition and articles thereof can also be incorporated into the casings of electronics or other structural components. In general, any device that relies on the performance characteristics of an electronic processor or other electronic circuit can benefit from the increased or more stable performance characteristics resulting from utilizing aspects of the compositions disclosed herein.

The compositions described herein can provide improved thermal stability to the device, resulting in the ability to avoid degradation of performance and lifetime of the electronic devices. The fusible, phase-change powder compositions are further advantageous for use as thermal management materials, especially in electronics, because they can easily be injected into cavities of irregular shapes that can be difficult to fill completely with solid composition PCMs, permitting maximum heat absorption capacity.

The following example is merely illustrative of the fusible, phase-change powder composition and method of manufacture disclosed herein and is not intended to limit the scope hereof.

Example

The melting temperature and enthalpy ($\Delta H$) of the transition of a material can be determined by differential scanning calorimetry (DSC), e.g., using a Perkin Elmer DSC 4000, or equivalent, according to ASTM D3418.

A fusible powder composition was made by gradually dissolving 7 grams of KRATON D1118 (a clear, diblock copolymer based on styrene and butadiene with a polystyrene content of 33%) into 78 grams of melted PCM43P (Microtek Laboratories, Inc.) (paraffin wax with phase change temperature at 43° C.) using a planetary Ross mixer. The setup temperature for the Ross mixer was 90° C. After the polymers were fully dissolved into the melted wax, 15 grams of ATH 432 SG from Huber Engineered Materials (aluminum hydroxide, or aluminum trihydrate) were gradually added into the melted system until a homogenous composition is formed. The mixture was cooled with continued mixing. The PCM mixture was removed from the Ross mixer and broken down into a small diameter powder in a Wiley grinder with the grinder chamber filled with liquid nitrogen. Average particle size of the resultant PCM powder was determined by laser light scattering to be about 14 microns.

A sample of the resultant PCM powder was placed into a glass vial which was placed in a 65° C. oven for 10 minutes. After the glass vial was removed from the oven, the powder was observed to be fused together and no powder fell from the inverted glass vial.

Differential scanning calorimetry was performed on the PCM powder to determine the heat of fusion. The FIGURE shows the DSC results for the PCM powder. As can be seen, the powder has a high heat of fusion, 204.8 J/g.

The claims are further illustrated by the following aspects, which are non-limiting.

Aspect 1: A fusible, phase-change powder composition, comprising a plurality of powder particles comprising a polymer composition, an unencapsulated phase-change material, and optionally, an additive composition; wherein the powder composition is fusible at a temperature of 25 to 105° C., or 28 to 60° C., or 45 to 85° C., or 60 to 80° C., or 80 to 100° C., preferably the powder composition is fusible but not flowable at the temperature.

Aspect 2: The fusible, phase-change powder composition of aspect 1, wherein a solubility parameter of the polymer is within ±1, or ±0.9, or ±0.8, or ±0.7, or ±0.6, or ±0.5, or ±0.4, or ±0.3 of the solubility parameter of the phase-change material; or wherein the polymer composition comprises an elastomeric block copolymer, an elastomeric graft copolymer, an elastomeric random copolymer, an elastomer, or a polyolefin; preferably wherein the polymer composition comprises a styrene-ethylene/propylene-styrene block copolymer, a styrene-butadiene block copolymer, a styrene-ethylene/butylene-styrene block copolymer, a polybutadiene, an isoprene, a polybutadiene-isoprene copolymer, an ethylene-propylene rubber, an ethylene-propylene-diene monomer rubber, a natural rubber, butyl rubber, cyclic olefin copolymer, polydicyclopentadiene rubber, or a combination comprising at least one of the foregoing; more preferably wherein the polymer composition comprises a styrene-ethylene/propylene-styrene block copolymer, a styrene-butadiene block copolymer, or a styrene-ethylene/butylene-styrene block copolymer.

Aspect 3: The fusible, phase-change powder composition of aspect 1 or 2, wherein a solubility parameter of the polymer is within ±1, or ±0.9, or ±0.8, or ±0.7, or ±0.6, or ±0.5, or ±0.4, or ±0.3 of the solubility parameter of the phase-change material; or wherein the polymer composition comprises a cyclic olefin polymer, fluoropolymer, polyacetal, poly($C_{1-6}$ alkyl)acrylate, polyacrylamide, polyacrylonitrile, polyamide, polyamideimide, polyanhydride, polyarylene ether, polyarylene ether ketone, polyarylene ketone, polyarylene sulfide, polyarylene sulfone, polycarbonate, polyester, polyetherimide, polyimide, poly($C_{1-6}$ alkyl)methacrylate, polymethacrylamide, polyolefin, polyoxymethylene, polysiloxane, polystyrene, polysulfide, polysulfonamide, polysulfonate, polythioester, polytriazine, polyurea, polyurethane, vinyl polymer, alkyd, bismaleimide polymer, bismaleimide triazine polymer, cyanate ester polymer, benzocyclobutene polymer, diallyl phthalate polymer, epoxy, hydroxymethylfuran polymer, melamine-formaldehyde polymer, phenolic polymer, benzoxazine polymer, polydiene, polyisocyanate, polyurea, polyurethane, silicone, triallyl cyanurate polymer, or triallyl isocyanurate polymer.

Aspect 4: The fusible, phase-change powder composition of any one or more of aspects 1 to 3, wherein the unencapsulated phase-change material comprises a $C_{10-35}$ alkane, fatty acid, or fatty acid ester; preferably a $C_{18-28}$ alkane, fatty acid, or fatty acid ester; more preferably a paraffin having a melting temperature of 25 to 65° C., or 35 to 60° C.

Aspect 5: The fusible, phase-change powder composition of any one or more of aspects 1 to 4, wherein the unencapsulated phase-change material has a melting temperature of 5 to 70° C., preferably 25 to 65° C., more preferably 35 to 60° C., yet more preferably 30 to 50° C.; or a heat of fusion, determined by differential scanning calorimetry according to ASTM D4118, of greater than 150 Joules/gram, preferably greater than 180 Joules per gram, more preferably greater than 210 Joules/gram.

Aspect 6: The fusible, phase-change powder composition of any one or more of aspects 1 to 5, further comprising an additive composition, wherein the additive composition comprises an encapsulated phase-change material, a flame retardant, a thermal stabilizer, an antioxidant, a thermoconductive filler, a thermally insulating filler, a magnetic filler, a colorant, or a combination comprising at least one of the foregoing; preferably wherein the flame retardant is a metal carbonate, a metal hydrate, a metal oxide, a halogenated organic compound, an organic phosphorus-containing compound, a nitrogen-containing compound, a phosphinate salt, or a combination comprising at least one of the foregoing; preferably wherein the flame retardant is aluminum trihydroxide, magnesium hydroxide, antimony oxide, decabromodiphenyl oxide, decabromodiphenyl ethane, ethylene-bis (tetrabromophthalimide), melamine, zinc stannate, boron oxide, or a combination comprising at least one of the foregoing.

Aspect 7: The fusible, phase-change powder composition of any one or more of aspects 1 to 6, comprising 3 to 80 weight percent, or 10 to 60 weight percent, or 15 to 50 weight percent, or 5 to 20 weight percent of a polymer composition; 20 to 97 weight percent, or 40 to 90 weight percent, or 70 to 97 weight percent, of an unencapsulated phase-change material; and 0 to 60 weight percent, or more than 0 to 20 weight percent, or 2 to 25 weight percent, or 5 to 20 weight percent of the additive composition; wherein weight percent is based on the total weight of the composition and totals 100 weight percent.

Aspect 8: The fusible, phase-change powder composition of any one or more of aspects 1 to 7, having a heat of fusion, determined by differential scanning calorimetry according to ASTM D4118, at the melting temperature of at least 150 Joules/gram, preferably at least 200 Joules/gram, more preferably at least 210 Joules/gram Aspect 9: The fusible, phase-change powder composition of any one of aspects 1 to 8, wherein the average particle size of the powder is 1 to 500 micrometers, or 5 to 300 micrometers, or 10 to 200 micrometers.

Aspect 10: A solid phase-change composition made from the fusible, phase-change powder of any one or more of aspects 1 to 9.

Aspect 11: A method of manufacturing the fusible, phase-change powder composition of any one or more of aspects 1 to 9, the method comprising: combining a composition comprising the polymer composition and optionally a solvent, molten unencapsulated phase-change material, and optionally an additive composition to form a mixture; optionally removing the solvent from the mixture; cooling the mixture to provide a solid phase-change material; and reducing the solid phase-change material to a powder to provide a fusible, phase-change powder composition.

Aspect 12: The method of aspect 11, wherein reducing the solid phase-change material to a powder comprises cryo-grinding the solid phase-change material to a powder.

Aspect 13: The method of aspect 11 or 12, wherein grinding is performed by a planetary ball mill.

Aspect 14: The method of any one of aspects 11 to 13, wherein the particle size of the powder is 1 to 500 micrometers, or 5 to 300 micrometers, or 10 to 200 micrometers.

Aspect 15: An article comprising the fusible, phase-change powder composition of any one or more of aspects 1 to 9, the solid phase-change composition of aspect 10, or made by the method of any one or more of aspects 11 to 14.

Aspect 16: The article of aspect 15, wherein the fusible, phase-change powder composition is disposed in a cavity of the article.

Aspect 17: The article of aspect 15 or 16, wherein the fusible, phase-change powder composition is fused at elevated temperature to provide a solid.

Aspect 18: A method of manufacturing an article comprising a phase-change composition, the method comprising injecting the fusible, phase-change powder composition of any one or more of aspect 1 to 17 into a cavity of an article at a first temperature below the melting point of the phase-change material in the fusible, phase-change powder composition, and heating the fusible, phase-change powder composition at a second temperature above the melting point of the phase-change material in the fusible, phase-change powder composition and below the glass transition temperature of the composition to form a fused, solid phase-change composition, wherein the second temperature preferably is 25 to 105° C., or 28 to 60° C., or 45 to 85° C., or 60 to 80° C., or 80 to 100° C.

Aspect 19: The method of aspect 18 or the article of aspect 16 or 17, wherein the cavity has a smallest dimension of greater than the average particle size of the powder and less than 2 centimeters, preferably less than 1 centimeter, more preferably less than 0.5 centimeter.

Aspect 20: The method of aspect 18 or 19 or, the article of any one of embodiments 15 to 17, wherein the article is an electronic device, preferably a hand-held electronic device.

In general, the articles and methods described here can alternatively comprise, consist of, or consist essentially of, any components or steps herein disclosed. The articles and methods can additionally, or alternatively, be manufactured or conducted so as to be devoid, or substantially free, of any ingredients, steps, or components not necessary to the achievement of the function or objectives of the present claims.

The singular forms "a," "an," and "the" include plural referents unless the context clearly dictates otherwise. "Or" means "and/or." Unless defined otherwise, technical and scientific terms used herein have the same meaning as is commonly understood by one of skill in the art to which the claims belong. A "combination" is inclusive of blends, mixtures, alloys, reaction products, and the like. The values described herein are inclusive of an acceptable error range for the particular value as determined by one of ordinary skill in the art, which will depend in part on how the value is measured or determined, i.e., the limitations of the measurement system. The endpoints of all ranges directed to the same component or property are inclusive of the endpoints and intermediate values, and independently combinable.

Unless specified otherwise herein, all test standards are the most recent standard in effect as of the filing date of this application, or, if priority is claimed, the filing date of the earliest priority application in which the test standard appears. Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the disclosed subject matter is described herein in terms of some embodiments and representative examples, those skilled in the art will recognize that various modifications and improvements can be made to the disclosed subject matter without departing from the scope thereof. Additional features known in the art likewise can be incorporated. Moreover, although individual features of some embodiments of the disclosed subject matter can be discussed herein and not in other embodiments, it should be apparent that individual features of some embodiments can be combined with one or more features of another embodiment or features from a plurality of embodiments.

What is claimed is:

1. A fusible, phase-change powder composition, comprising:
   a plurality of powder particles comprising
   5 to 20 weight percent of a polymer composition comprising a styrene-ethylene/propylene-styrene block copolymer, a styrene-butadiene block copolymer, or a styrene-ethylene/butylene-styrene block copolymer,
   80 to 97 weight percent of an unencapsulated phase-change material comprising a paraffin having a melting temperature of 35 to 60° C., wherein weight percent is based on the total weight of the phase-change powder composition, and
   optionally, an additive composition;
   wherein the powder composition is fusible at a temperature of 25 to 105° C.

2. The fusible, phase-change powder composition of claim 1, wherein the plurality of powder particles comprises 85 to 97 weight percent of the unencapsulated phase-change material comprising the paraffin having the melting temperature of 35 to 60° C., wherein weight percent is based on the total weight of the phase-change powder composition.

3. The fusible, phase-change powder composition of claim 1, wherein
   a solubility parameter of the polymer is within ±1 of the solubility parameter of the phase-change material.

4. The fusible, phase-change powder composition of claim 1, wherein the plurality of powder particles comprises 90 to 97 weight percent of the unencapsulated phase-change material comprising the paraffin having the melting temperature of 35 to 60° C., wherein weight percent is based on the total weight of the phase-change powder composition.

5. The fusible, phase-change powder composition of claim 1, wherein
   the unencapsulated phase-change material has a heat of fusion, determined by differential scanning calorimetry according to ASTM D4118, of greater than 150 Joules/gram.

6. The fusible, phase-change powder composition of claim 1, comprising the additive composition,
   wherein the additive composition comprises an encapsulated phase-change material, a flame retardant, a thermal stabilizer, an antioxidant, a thermoconductive filler, a thermally insulating filler, a magnetic filler, a colorant, or a combination thereof.

7. The fusible, phase-change powder composition of claim 1, comprising
   5 to 20 weight percent of the additive composition;
   wherein weight percent is based on the total weight of the phase-change powder composition and totals 100 weight percent.

8. The fusible, phase-change powder composition of claim 1, having a heat of fusion, determined by differential scanning calorimetry according to ASTM D4118, at the melting temperature of
   at least 150 Joules/gram.

9. The fusible, phase-change powder composition of claim 1, wherein the average particle size of the powder is 1 to 500 micrometers.

10. A solid phase-change composition made from the fusible, phase-change powder of claim 1.

11. A method of manufacturing the fusible, phase-change powder composition of claim 1, the method comprising:
    combining
    a composition comprising the polymer composition and optionally a solvent,
    molten unencapsulated phase-change material, and
    optionally an additive composition to form a mixture;
    optionally removing the solvent from the mixture;
    cooling the mixture to provide a solid phase-change material; and
    reducing the solid phase-change material to a powder to provide a fusible, phase-change powder composition.

12. The method of claim 11, wherein reducing the solid phase-change material to a powder comprises grinding.

13. The method of claim 11, wherein grinding is performed by a planetary ball mill.

14. The method of claim 11, wherein the particle size of the powder is 1 to 500 micrometers.

15. An article comprising the fusible, phase-change powder composition of claim 1.

16. The article of claim 15, wherein the fusible, phase-change powder composition is disposed in a cavity of the article.

17. The article of claim 15, wherein the fusible, phase-change powder composition is fused at elevated temperature to provide a solid.

18. A method of manufacturing an article comprising a phase-change composition, the method comprising
    injecting the fusible, phase-change powder composition of claim 1 into a cavity of an article at a first temperature below the melting point of the phase-change material in the fusible, phase-change powder composition, and
    heating the fusible, phase-change powder composition at a second temperature above the melting point of the phase-change material in the fusible, phase-change powder composition and below the glass transition temperature of the composition to form a fused, solid phase-change composition.

19. The article of claim 16, wherein the cavity has a smallest dimension of greater than the average particle size of the powder and less than 2 centimeters.

20. The article of claim 15, wherein the article is an electronic device.

* * * * *